(12) United States Patent
Jo et al.

(10) Patent No.: US 8,686,935 B2
(45) Date of Patent: Apr. 1, 2014

(54) LIQUID CRYSTAL DISPLAY DEVICE AND METHOD FOR DRIVING THE SAME

(75) Inventors: Q Haing Jo, Seoul (KR); Se Young Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 686 days.

(21) Appl. No.: 12/955,411

(22) Filed: Nov. 29, 2010

(65) Prior Publication Data

US 2011/0157107 A1 Jun. 30, 2011

(30) Foreign Application Priority Data

Dec. 29, 2009 (KR) ........................ 10-2009-0132497

(51) Int. Cl.
*G09G 3/36* (2006.01)
(52) U.S. Cl.
USPC ............................................. 345/96; 345/87
(58) Field of Classification Search
USPC .............. 345/87, 90, 92, 96, 99, 209; 349/37, 349/150
See application file for complete search history.

(56) References Cited

U.S. PATENT DOCUMENTS

| 6,552,707 | B1 | 4/2003 | Fujiyoshi | |
|---|---|---|---|---|
| 2002/0050968 | A1 | 5/2002 | Tanaka et al. | |
| 2002/0084968 | A1 | 7/2002 | Lee | |
| 2002/0097214 | A1 | 7/2002 | Song | |
| 2003/0197672 | A1 | 10/2003 | Yun et al. | |
| 2005/0184940 | A1 | 8/2005 | Oh et al. | |
| 2006/0120160 | A1 | 6/2006 | Park et al. | |
| 2007/0052878 | A1* | 3/2007 | Song et al. ...................... | 349/54 |
| 2008/0068358 | A1 | 3/2008 | Lee | |
| 2008/0123002 | A1* | 5/2008 | Yeh ................................ | 349/37 |
| 2008/0266232 | A1 | 10/2008 | Hsu | |
| 2009/0284673 | A1* | 11/2009 | Kim et al. ...................... | 349/33 |
| 2010/0033419 | A1* | 2/2010 | Lin ................................ | 345/100 |
| 2011/0007257 | A1* | 1/2011 | Min et al. ...................... | 349/150 |

FOREIGN PATENT DOCUMENTS

| CN | 1746757 | 3/2006 |
|---|---|---|
| DE | 69625261 | 9/2003 |
| JP | 4103703 B2 | 6/2008 |
| KR | 10-2005-0082488 A | 8/2005 |
| TW | 200818107 | 4/2008 |
| TW | 200842791 | 11/2008 |

* cited by examiner

*Primary Examiner* — Ricardo L Osorio
(74) *Attorney, Agent, or Firm* — McKenna, Long & Aldridge, LLP

(57) ABSTRACT

An liquid crystal display device, including: m+1 data lines crossing n gate lines defining m×n pixels; m×n thin film transistors in each of the m×n pixels, wherein n thin film transistors in a column m are alternately connected to the $m^{th}$ data line and the $m+1^{th}$ data line; and an electrical connector that connects a $1^{st}$ data line to an $m+1^{th}$ data line.

14 Claims, 6 Drawing Sheets

LIQUID CRYSTAL DISPLAY DEVICE AND METHOD FOR DRIVING THE SAME

CROSS REFERENCE TO RELATED APPLICATIONS

This application claims the benefit of the Korean Patent Application No. 10-2009-0132497 filed on Dec. 29, 2009, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device that facilitates reducing power consumption in a dot inversion display driving method using a column inversion display driving method.

2. Discussion of the Related Art

Generally, a liquid crystal display (LCD) device displays a desired image by controlling a transmittance of light supplied from a backlight unit through the use of liquid crystal display panel, wherein the liquid crystal display panel includes a plurality of liquid crystal cells arranged in a matrix-type configuration, and a plurality of control switches for supplying image signals to the liquid crystal cells.

In the LCD device, the liquid crystal cells in the liquid crystal display panel may be driven by a frame inversion method, a line or column inversion method, or a dot inversion method.

In the frame inversion method, a polarity of the image signal supplied to the liquid crystal cells in the liquid crystal display panel are inverted every frame.

In the line inversion method, a polarity of the image signal supplied to the liquid crystal cells in the liquid crystal display panel are inverted every horizontal line corresponding to a gate line and also inverted every frame. The line inversion method may cause a cross-talk problem among the liquid crystal cells in a horizontal direction, whereby a flicker in a stripe pattern may appear as horizontal lines.

In the column inversion method, a polarity of the image signal supplied to the liquid crystal cells in the liquid crystal display panel are inverted every vertical line corresponding to a data line and also inverted every frame. The column inversion method may cause a cross-talk problem among the liquid crystal cells in a vertical direction, whereby a flicker in a stripe pattern may appear as vertical lines.

In the dot inversion method, a polarity of the image signal supplied to the liquid crystal cells on the liquid crystal display panel are inverted every liquid crystal cell and also inverted every frame. That is, a polarity of the image signal is applied to the liquid crystal cells so that the polarity of adjacent cells alternates in the horizontal and vertical directions. By applying the dot inversion method, picture quality can be improved in comparison to the other inversion methods because the flicker in the liquid crystal cells adjacent in the horizontal and vertical directions is offset.

However, the dot inversion method is driven so that the polarity of the image signal supplied to the data lines is inverted in both the horizontal and vertical directions. Accordingly, the dot inversion method has the problem of high power consumption because the pixel voltage variation, that is, frequency of the image signal in the dot inversion method is relatively larger than those of the other inversion methods.

SUMMARY OF THE INVENTION

Accordingly, the present invention is directed to an LCD device that substantially obviates one or more problems due to limitations and disadvantages of the related art.

An advantage of the present invention is to provide an LCD device that reduces power consumption in a dot inversion method by using a pixel voltage of a column inversion method.

Another advantage of the present invention is to provide an LCD device that prevents picture quality deterioration due to a charge failure of a pixel voltage because of an impedance deviation in data lines.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, an liquid crystal display device, including: m+1 data lines crossing n gate lines defining m×n pixels; m×n thin film transistors in each of the m×n pixels, wherein n thin film transistors in a column m are alternately connected to the $m^{th}$ data line and the $m+1^{th}$ data line; and an electrical connector that connects a $1^{st}$ data line to an $m+1^{th}$ data line.

In another aspect of the present invention, A method of driving a liquid crystal display device, wherein the liquid crystal device has liquid crystal cells arranged in an m×n matrix with m+1 data lines and n gate lines and wherein the liquid crystal cells in a column are alternatively connected to data lines on opposite sides of the column, including: receiving a frame of image data that includes horizontal lines of data; supplying $1^{st}$ through $m^{th}$ data in a first horizontal line of data to $1^{st}$ through $m^{th}$ data lines, wherein the polarity alternates along the first horizontal line of data; and supplying the $1^{st}$ through $m-1^{th}$ data in a second horizontal line to the $2^{nd}$ through $m^{th}$ data lines and supplying the mth data in the second horizontal line to the $1^{st}$ data line, wherein the polarity alternates along the second horizontal line of data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an LCD device according to the present invention will be described with reference to the accompanying drawings.

Figure 1:
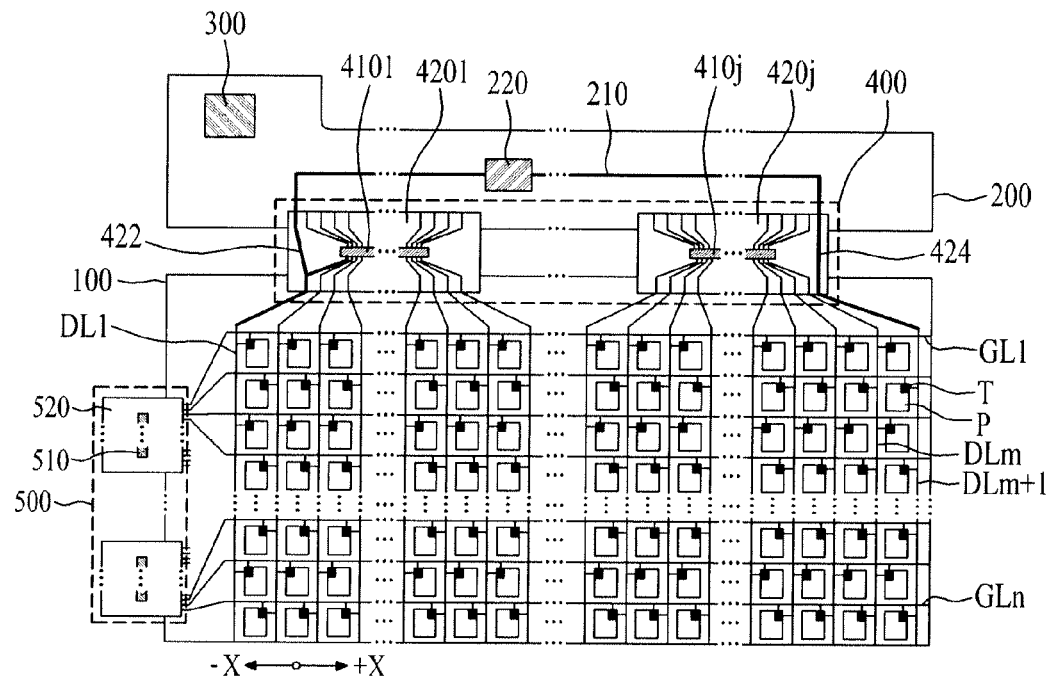
FIG. 1 illustrates an LCD device according to the first embodiment of the present invention.
Figure 2:
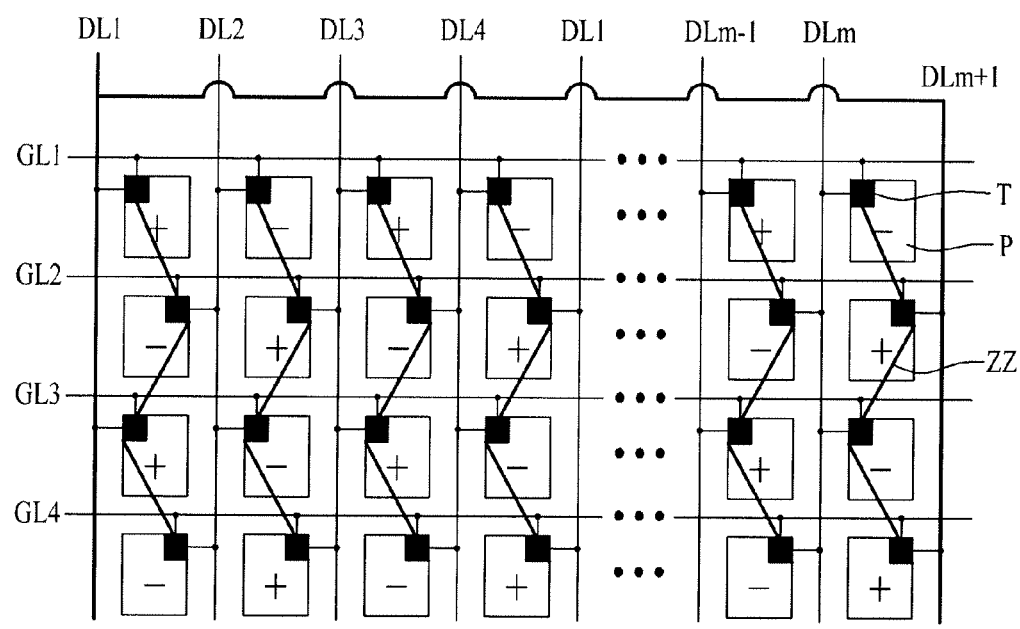
FIG. 2 illustrates an arrangement of liquid crystal cells in the LCD device of FIG. 1.

FIG. 1 illustrates an LCD device according to the first embodiment of the present invention. FIG. 2 illustrates an arrangement of liquid crystal cells in the LCD device of FIG. 1.

Referring to FIGS. 1 and 2, the LCD device according to the first embodiment of the present invention includes a liquid crystal display panel 100, a printed circuit board 200, a timing controller 300, a data driving circuit 400, and a gate driving circuit 500.

On the liquid crystal display panel 100, there are a plurality of liquid crystal cells defined by crossing 'n' gate lines (GL1 to GLn) and 'm+1' data lines (DL1 to DLm+1). At this time, the (m+1)th data line (DLm+1) is connected to the first data line (DL1) through the printed circuit board 200.

Each of the plurality of liquid crystal cells includes a thin film transistor (T) and a pixel (P), wherein the thin film transistor (T) is connected to any one of the 'n' gate lines (GL1 to GLn) and any one of the 'm+1' data lines (DL1 to DLm+1) and the pixel (P) is connected to the thin film transistor (T).

The liquid crystal cells are connected to the data lines (DL1 to DLm+1) in a zigzag pattern (ZZ) through the thin film transistors (T) arranged in a zigzag pattern along each of the data lines (DL1 to DLm+1). In other words, the liquid crystal cells included in the same column are alternately connected to the adjacent data lines (DL) every horizontal line.

For example, the liquid crystal cells of the odd-numbered horizontal lines connected to the odd-numbered gate lines (GL1, GL3, . . . ) are respectively connected to the first to (m)th data lines (DL1 to DLm) positioned in the minus direction of the X-axis (−X) with respect to the corresponding liquid crystal cell.

Meanwhile, the liquid crystal cells of the even-numbered horizontal lines connected to the even-numbered gate lines (GL2, GL4, . . . ) are respectively connected to the second to (m+1)th data lines (DL2 to DLm+1) positioned in the plus direction of the X-axis (+X) with respect to the corresponding liquid crystal cell.

While the odd-numbered data lines (DL1, DL3, . . . ) are alternately connected to the odd-numbered liquid crystal cells and the even-numbered liquid crystal cells every horizontal line, the even-numbered data lines (DL2, DL4, . . . ) are alternately connected to the even-numbered liquid crystal cells and the odd-numbered liquid crystal cells every horizontal line.

The thin film transistor (T) supplies a pixel voltage from the data line (DL1 to DLm+1) to the corresponding liquid crystal cell in response to a gate signal from the gate line (GL1 to GLn).

The pixel (P) includes a pixel electrode (not shown) connected to the thin film transistor (T), and a common electrode (not shown) which is positioned adjacent to the pixel electrode with liquid crystal interposed therebetween. The pixel (P) controls the light transmittance of the liquid crystal by driving the liquid crystal according to the pixel voltage supplied through the thin film transistor (T), to thereby display a predetermined image.

The printed circuit board 200 is connected to the data driving circuit 400, wherein the printed circuit board 200 relays timing control signals and image data output from the timing controller 300 and driving voltages output from a power source circuit (not shown) to the data driving circuit 400 and the gate driving circuit 500.

On the printed circuit board 200, there is a pixel voltage transmission line 210 to electrically connect the first data line (DL1) and the (m+1)th data line (DLm+1) to each other.

The pixel voltage transmission line 210 transmits the pixel voltage output from the data driving circuit 400 to the first data line (DL1) to the (m+1)th data line (DLm+1) every even-numbered horizontal period.

Figure 3:
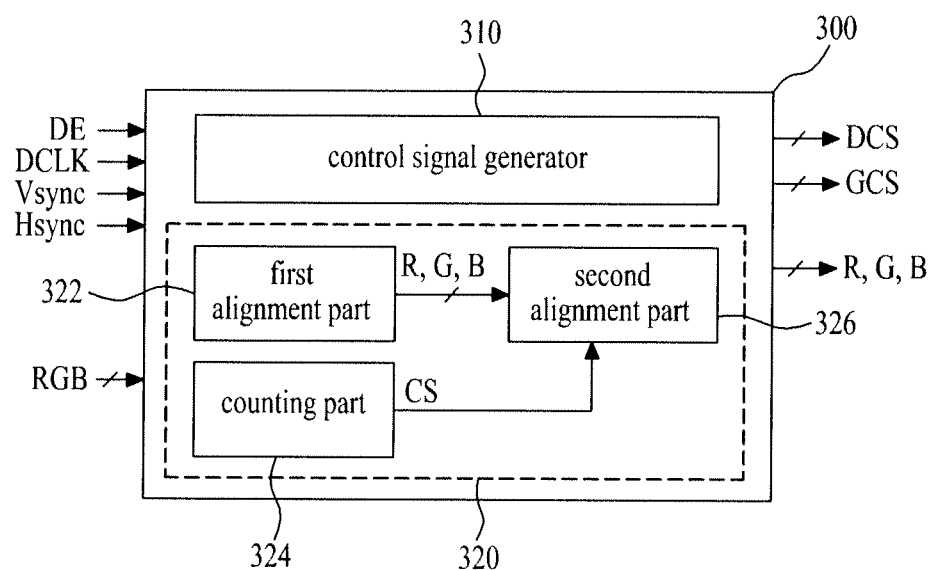
FIG. 3 illustrates a timing controller in the LCD device of FIG. 1.

The timing controller 300 is on the printed circuit board 200. The timing controller 300 generates image data and timing control signals to display the image corresponding to an input image on the liquid crystal display panel 100 through the use of input image and timing synchronous signals input through a user connector (not shown) on the printed circuit board 200. As shown in FIG. 3, the timing controller 300 includes a control signal generator 310 and a data processor 320.

The control signal generator 310 generates a data control signal (DCS) that controls a driving timing of the data driving circuit 400 and a gate control signal (GCS) that controls a driving timing of the gate driving circuit 500 through the use of timing synchronous signals input through the user connector, for example, data enable (DE), dot clock (DCLK), vertical synchronous signal (Vsync), horizontal synchronous signal (Hsync).

The data control signal (DCS) may be a source start pulse, a source sampling clock, a source output enable, a polarity control single (POL), etc. At this time, the polarity control signal (POL) may be inverted every at least one frame.

The gate control signal (GCS) may be a gate start pulse, a gate shift clock, a gate output enable, etc.

The data processor 320 aligns the input image data (RGB) into units for the respective horizontal periods through the use of horizontal synchronous signal (Hsync), wherein each unit includes 'm' input image data (RGB). The data processor 320 generates 'm' alignment data for each unit of the input image (RGB) and generates 'm' image data for the (i)th horizontal period ('i' is an odd or even number) to be supplied to the first to (m)th data lines according to the horizontal period, or generates 'm' image data for the (i+1)th horizontal period to be supplied to the second to (m+1)th data lines according to the horizontal period. Among the 'm' image data for the (i+1)th horizontal period, the first image data corresponds to the image data to be supplied to the (m+1)th data line. For this, the data processor 320 includes a first alignment part 332, a counting part 324, and a second alignment part 326.

The first alignment part 322 generates the 'm' alignment data by aligning the input image (RGB) for each horizontal line according to the aforementioned timing synchronous signal.

The counting part 324 generates a counting signal (CS) with a first logic state corresponding to the odd-numbered horizontal period, and a counting signal (CS) of a second logic state corresponding to the even-numbered horizontal period by counting the horizontal synchronous signal (Hsync) and the counting part 324 supplies the generated counting signal (CS) to the second alignment part 326.

The second alignment part 326 re-aligns the 'm' alignment data according to the logic state of the counting signal (CS) supplied from the counting part 324 and generates the 'm' image data for the (i)th horizontal period, or the 'm' image data for the (i+1)th horizontal period.

In more detail, if the counting signal (CS) of the first logic state is supplied to the second alignment part 326 from the counting part 324, the second alignment part 326 pass the 'm' alignment data unaltered, to thereby generate the 'm' image data for the (i)th horizontal period.

Figure 4:
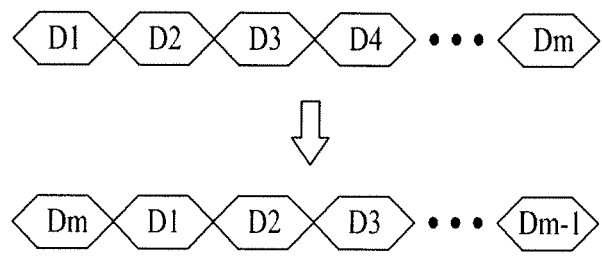
FIG. 4 illustrates data re-alignment by a second alignment part of FIG. 3.

Meanwhile, if the counting signal (CS) of the second logic state is supplied to the second alignment part 326 from the counting part 324, the second alignment part 326 shifts the 'm' alignment data one-by-one, as shown in FIG. 4 and simultaneously re-aligns the (m)th alignment data (Dm) to be positioned at the first alignment data so as to generate the 'm' image data (Dm, D1 to Dm−1) for the (i+1)th horizontal period, in which the 'm' image data is re-aligned in order of the (m)th alignment data, and the first to (m−1)th alignment data. Also, the 'm' alignment data may be shifted in the other direction, i.e., the second alignment part 326 shifts the 'm' alignment data one-by-one and simultaneously re-aligns the first alignment data (D1) to be positioned at the last alignment data so as to generate the 'm' image data (D2 to Dm, D1) for the (i+1)th horizontal period, in which the 'm' image data is re-aligned in order of the $2^{nd}$ to (m)th alignment data, and the first alignment data. In either of these case a circular shift of the data is done either to the left or the right.

In FIG. 1, the data driving circuit 400 includes 'j' data driving integrated circuits 4101 to 410j (wherein, 'j' is an integer of value m/k, and 'k' is an integer between 'j' and 'm') which convert the 'm' image data for the (i) th horizontal period or (i+1)th horizontal period, supplied from the timing controller 300 according to the horizontal period, into the 'm' pixel voltages, and then supplies the 'm' pixel voltages to the first to (m)th data lines (DL1 to DLm).

Each of the 'j' data driving integrated circuits 4101 to 410j has 'k' output channels respectively connected to 'k' data lines. Thus, each of the 'j' data driving integrated circuits 4101 to 410j converts 'k' of the 'm' image data to pixel voltages having a polarity of a column inversion method and then supplies the pixel voltage to the connected 'k' data lines. Accordingly, the pixel voltage output from the output channel of each of the 'j' data driving integrated circuits 4101 to 401j is inverted every output channel and the aforementioned pixel voltage has the polarity of the column inversion method which is inverted at least every one frame according to the polarity control signal (POL).

The data driving circuit 400 supplies the 'm' pixel voltages to the 'm' data lines through the use of 'j' data driving integrated circuits 4101 to 410j having the same number of 'k' output channels. However, because the (m+1)th data line (DLm+1) exists in the liquid crystal display panel 100, the data driving circuit 400 requires one more output channel. In this case, the number of output channels in the (j) th data driving integrated circuit 410j has to be increased by one, so that it has a problem of additionally manufacturing the data driving integrated circuit having the 'k+1' output channels. In order to overcome this problem, the data driving circuit 400 of the present invention supplies the pixel voltage corresponding to the image data re-aligned in the timing controller 300 according to the horizontal period to the first data line (DL1) or the (m+1)th data line (DLm+1) through the first output channel of the first data driving integrated circuit 4101.

In more detail, the pixel voltage to be supplied to the first data line (DL1) or the (m+1)th data line (DLm+1), which is converted from the first image data for the (i)th horizontal period or the (i+1)th horizontal period supplied from the timing controller 300 according to the horizontal period, is output to the first output channel of the first data driving integrated circuit 4101 among the 'j' data driving integrated circuits 4101 to 410j. That is, if the 'k' image data for the (i)th horizontal period is supplied to the first data driving integrated circuit 4101, the pixel voltage to be supplied to the first data line (DL1) is output to the first output channel of the first data driving integrated circuit 4101. Meanwhile, if the 'k' image data for the (i+1)th horizontal period is supplied to the first data driving integrated circuit 4101, the pixel voltage to be supplied to the (m+1)th data line (DLm+1) is output to the first output channel of the first data driving integrated circuit 4101.

The aforementioned data driving circuit 400 has with the 'j' data driving integrated circuits 4101 to 410j, and 'j' data circuit films 4201 to 420j connected between the printed circuit board 200 and the liquid crystal display panel 100.

Each of the 'j' data circuit films 4201 to 420j is adhered to the liquid crystal display panel 100 and the printed circuit board 200 by a Tape Automated Bonding (TAB) process. Each of the 'j' data circuit films 4201 to 420j may be formed of Tape Carrier Package (TCP) or Chip On Film (COF). Also, the 'j' data driving integrated circuits 4101 to 410j are respectively formed in the 'j' data circuit films 4201 to 420j. Accordingly, each of the 'j' data circuit films 4201 to 420j supplies the image data and the data control signal (DCS) supplied from the printed circuit board 200 to each of the data driving integrated circuits 4101 to 410j.

The pixel voltage output from the first output channel of the first data driving integrated circuit 4101 is supplied to the (m+1)th data line (DLm+1) via the first data circuit film 4201, the pixel voltage transmission line 210 of the printed circuit board 200 and the (j) th data circuit film 420j. Accordingly, the first data circuit film 4201 includes a first signal line 422 to electrically connect the first output channel of the first data driving integrated circuit 4101 with the pixel voltage transmission line 210 of the printed circuit board 200 and the (j) th data circuit film 420j includes a second signal line 424 to electrically connect the pixel voltage transmission line 210 of the printed circuit board 200 with the (m+1)th data line (DLm+1). Thus, the invention implements dot inversion driving using a column inversion driving and also leads identical data driving integrated circuits.

Figure 5:
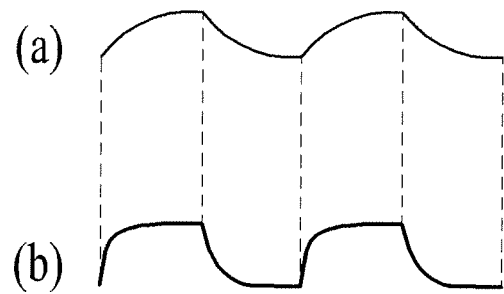
FIG. 5 illustrates a waveform diagram for explaining an impedance adjustment device in the LCD device of FIG. 1.

Because the first data line (DL1) and the (m+1)th data line (DLm+1) are electrically connected to each other through the pixel voltage transmission line 210, as shown in (a) of FIG. 5, the impedance on the first data line (DL1) and the (m+1)th data line (DLm+1) is relatively higher than an impedance on the remaining data lines (DL2 to DLm), which might cause a delay of the pixel voltage supplied to the first data line (DL1) and the (m+1)th data line (DLm+1). In order to minimize the delay of the pixel voltage supplied to the first data line (DL1) and the (m+1)th data line (DLm+1) in the LCD device according to an additional embodiment of the present invention, there may be an additional impedance adjustment device 220 connected to the pixel voltage transmission line 210, as shown in FIG. 1.

The impedance adjustment device 220 according to one embodiment of the present invention further includes a buffer connected to the pixel voltage transmission line 210. The buffer separates the impedance of the first data line (DL1) and the impedance of the (m+1)th data line (DLm+1) so as to adjust the entire impedance taken in the first output channel of the first data driving integrated circuit 4101, as shown in (b) of FIG. 5, to thereby prevent or minimize the delay of the pixel voltage. The impedance adjustment device 220 may also include other circuits that separate the impedance of the first data line (DL1) and the impedance of the (m+1)th data line (DLm+1).

Figure 6:
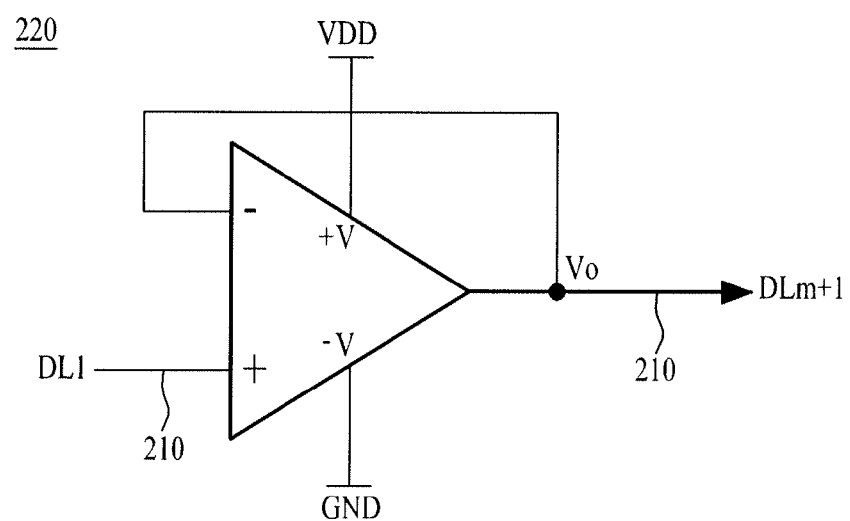
FIG. 6 illustrates a circuit diagram for explaining another example of the impedance adjustment device in the LCD device of FIG. 1.

The impedance adjustment device 220 according to another embodiment of the present invention may include an OP-AMP operated as a voltage follower, as shown in FIG. 6. The OP-AMP may include a non-inversion terminal (+) electrically connected to the first data line (DL1) through the pixel voltage transmission line 210, an output terminal (Vo) electrically connected to the (m+1)th data line (DLm+1) through the pixel voltage transmission line 210, and an inversion terminal (−) electrically connected to the output terminal (Vo). Also, the OP-AMP may further include a positive-polarity bias terminal (V+) supplied with a driving voltage (VDD) and a negative-polarity bias terminal (V−) supplied with a ground voltage.

The impedance adjustment device 220 including the OP-AMP separates the impedance of the first data line (DL1) and the impedance of the (m+1)th data line (DLm+1) so as to adjust the entire impedance taken in the first output channel of the first data driving integrated circuit 4101 through the use of voltage supplied to the non-inversion terminal (+) and voltage supplied to the inversion terminal (−), as show in (b) of FIG. 5, to thereby prevent or minimize the delay of the pixel voltage.

In FIG. 1, the gate driving circuit 500 may include a plurality of gate driving integrated circuits 510, and a plurality of gate circuit films 520.

The plurality of gate driving integrated circuits 510 generate the gate signals according to the gate control signal (GCS) supplied via the timing controller 300, the printed circuit board 200, the first data circuit film 4201, the liquid crystal display panel 100, and the gate circuit film 520 and then supply the generated gate signals to the 'n' gate lines (GL1 to GLn) in sequence.

The plurality of gate circuit films 520 are adhered to one side of the liquid crystal display panel 100 by a TAB process, wherein the plurality of gate circuit films 520 are provided at fixed intervals and are electrically connected to the 'n' gate lines (GL1 to GLn). Accordingly, each of the plurality of gate circuit films 520 may be formed of Tape Carrier Package (TCP) or Chip On Film (COF). Also, the gate driving integrated circuit 510 is formed in each of the plurality of gate circuit films 520.

Instead of forming the plurality of gate driving integrated circuits 510 on the gate circuit film 520, the plurality of gate circuit films 520 may be formed as the chip type on the liquid crystal display panel 100 by a Chip-On-Glass process or may be directly formed on the liquid crystal display panel 100 simultaneously with the thin film transistor by a Gate-In-Panel process.

Figure 7A:
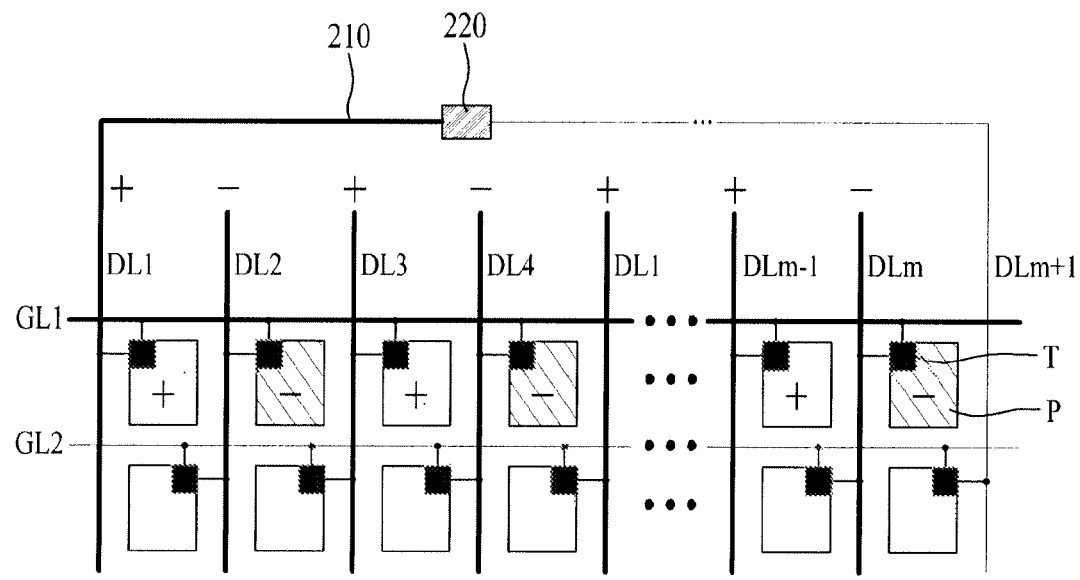
FIGS. 7A and 7B illustrate a method of driving the LCD device according to the first embodiment of the present invention.
Figure 7B:
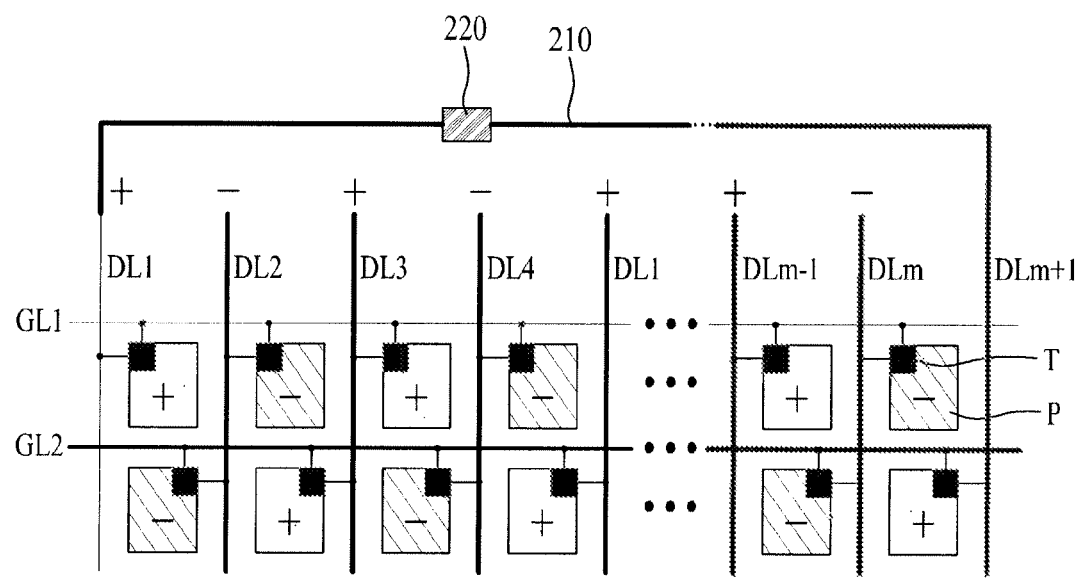

FIGS. 7A and 7B illustrate a driving method of the LCD device according to an embodiment of the present invention.

A driving method of the LCD device according to the embodiment of the present invention will be described with reference to FIGS. 7A and 7B in connection with FIG. 1.

First, as shown in FIG. 7A, during the odd-numbered horizontal period, for example, the first horizontal period, the data driving circuit 400 inverts the 'm' image data for the first horizontal period, supplied from the timing controller 300, into the first to (m)th pixel voltages (+, −, +, −, . . . ) of the column inversion method whose polarity is inverted every neighboring data line; and the data driving circuit 400 then supplies the first to (m)th pixel voltages to the first to (m)th data lines (DL1 to DLm) through the first to (m)th output channels. Accordingly, the pixel voltages with the polarity based on the column inversion method are supplied to the first to (m)th liquid crystal cells in the first horizontal line through the first to (m)th data lines (DL1 to DLm). Through the use of impedance adjustment device 220, a level of the entire impedance taken in the first output channel of the first data driving integrated circuit 4101 is adjusted to a level of the impedance taken in the second to (m)th data lines (DL2 to DLm), to thereby prevent the delay of the pixel voltage supplied to the first data line (DL1).

During the even-numbered horizontal period, for example, the second horizontal period, the data driving circuit 400 inverts the 'm' image data for the second horizontal period, supplied from the timing controller 300, into the first to (m)th pixel voltages (+, −, +, −, . . . ) of the column inversion method whose polarity is inverted every neighboring data line and then supplies the first to (m)th pixel voltages to the first to (m)th data lines (DL1 to DLm) through the first to (m)th output channels. Accordingly, the pixel voltages having the polarity based on the column inversion method are supplied to the first to (m)th liquid crystal cells in the second horizontal line through the second to (m+1)th data lines (DL2 to DLm+1). Through the use of impedance adjustment device 220, a level of the entire impedance taken in the first output channel of the first data driving integrated circuit 4101 is adjusted to a level of the impedance taken in the second to (m)th data lines (DL2 to DLm), to thereby prevent the delay of the pixel voltage supplied to the (m+1)th data line (DLm+1).

In the aforementioned LCD device according to the embodiment of the present invention, the pixel voltage output from the data driving circuit 400, the pixel voltage having the polarity based on the column inversion method, is supplied to the liquid crystal cells arranged in the zigzag pattern along the data lines (DL1 to DLm+1), whereby the liquid crystal cells arranged in the liquid crystal display panel 100 are driven using the dot inversion method, to thereby result in the decreased power consumption.

The liquid crystal display device according to the embodiment of the present invention uses the first and (m+1)th data lines (DL1, DLm+1) in common, so that it is unnecessary to increase the output channel in any one of the data driving integrated circuits 4101 to 410j, to thereby reduce the manufacturing cost.

The aforementioned LCD device according to an embodiment of the present invention can adjust the level of the entire impedance taken in the first output channel of the first data driving integrated circuit 4101 to the impedance level of the remaining data lines through the use of impedance adjustment device 220 connected to the pixel voltage transmission line 210 by electrically connecting the first and (m+1)th data lines (DL1, DLm+1) to each other, so that it is possible to prevent the deteriorated picture quality caused by the delay of the pixel voltage. Thus, the LCD device according to an embodiment of the present invention prevents a defective pixel-charging caused by a rapid driving of 120 Hz or more, to thereby prevent the deteriorated picture quality.

Figure 8:
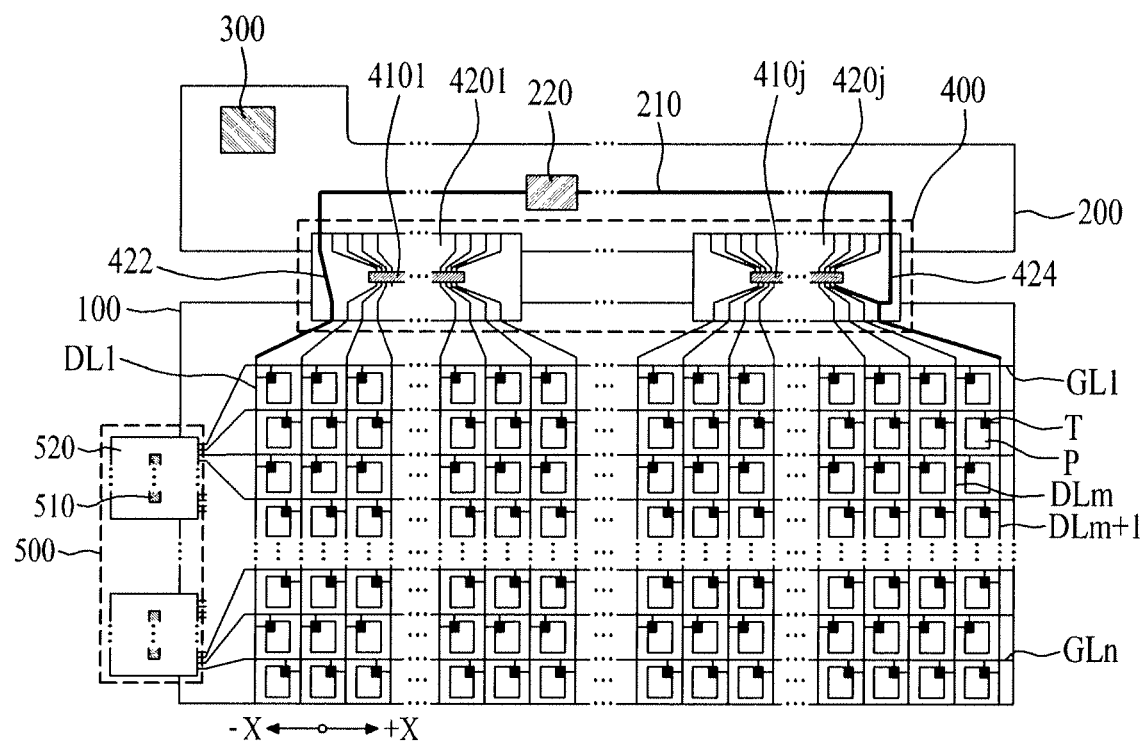
FIG. 8 illustrates another example of the LCD device according to the first embodiment of the present invention.

In the LCD device according to the first embodiment of the present invention, the pixel voltage supplied to the first and (m+1)th data lines (DL1, DLm+1) is provided from the first output channel of the first data driving integrated circuit 4101 through the pixel voltage transmission line 210. However, it is not limited to the aforementioned method, that is, the pixel voltage supplied to the first and (m+1)th data lines (DL1, DLm+1) may be provided from the (m)th output channel of the data driving circuit 400, as shown in FIG. 8.

The timing controller 300 aligns the data so as to supply the corresponding pixel voltage to the first and (m+1)th data lines (DL1, DLm+1) from the (m)th output channel of the data diving circuit 400 and then supplies the aligned data to the data driving circuit 400.

Also, the impedance adjustment device 220 includes a non-inversion terminal connected to the (m)th output channel of the data driving circuit 400 through the pixel voltage transmission line 210, an output terminal connected to the first data line (DL1) through the pixel voltage transmission line 210, and an inversion terminal connected to the output terminal.

Even though the pixel voltage supplied to the first and (m+1)th data lines (DL1, DLm+1) is provided from the (m)th output channel of the data driving circuit 400, the entire impedance taken in the (m)th output channel is adjusted by the impedance adjustment device 220, so that it is possible to realize the same effect as the first embodiment of the present invention.

Figure 9:
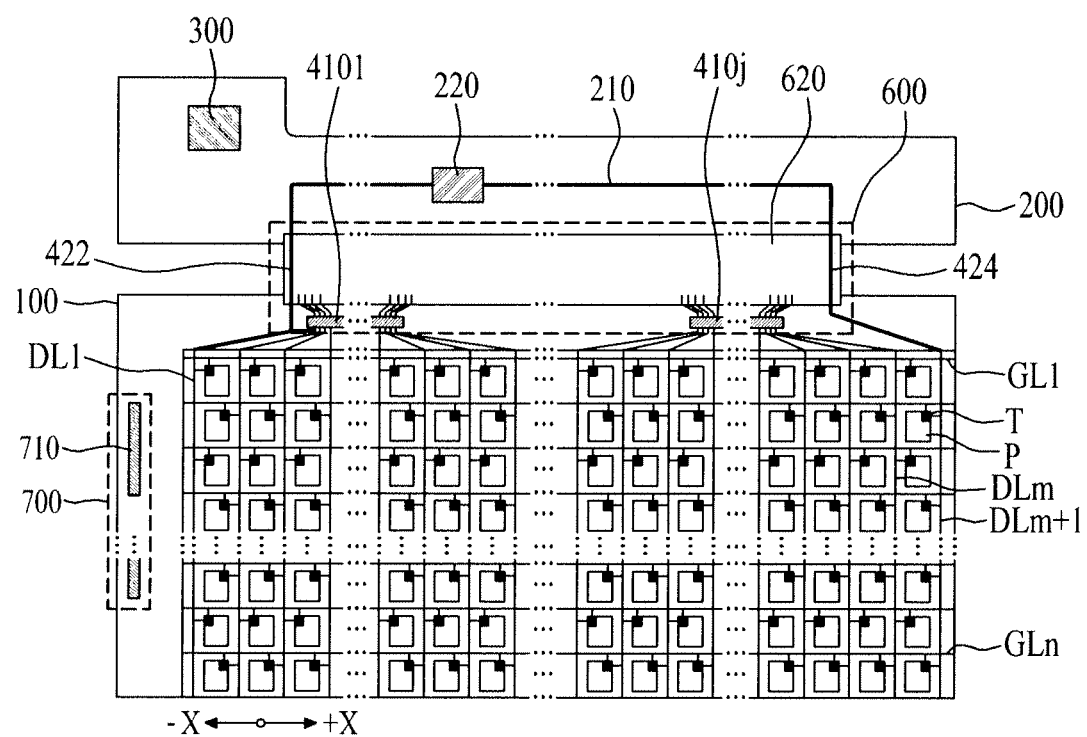
FIG. 9 illustrates an LCD device according to the second embodiment of the present invention.

FIG. 9 illustrates an LCD device according to the second embodiment of the present invention.

Referring to FIG. 9, the LCD device according to the second embodiment of the present invention includes a liquid crystal display panel 100, a printed circuit board 200, a timing controller 300, a data driving circuit 600, and a gate driving circuit 700.

Except for the structure of the data driving circuit 600 and gate driving circuit 700, the LCD device according to the second embodiment of the present invention is identical in structure to the LCD device according to the first embodiment of the present invention, whereby a detailed explanation for the same parts will be omitted, and the same reference numbers will be used throughout the drawings to refer to the same or like parts.

The data driving circuit 600 includes 'j' data driving integrated circuits 4101 to 410j and a flexible circuit film 620.

While each of the 'j' data driving integrated circuits 4101 to 401j is formed on each of the data circuit films 4201 to 420j in the LCD device according to the first embodiment of the present invention, each of the 'j' data driving integrated circuits 4101 to 401j is formed on the liquid crystal display panel 100 in the LCD device according to the second embodiment of the present invention. The data driving integrated circuit 4101 to 410j in the LCD device according to the second embodiment of the present invention is the same as that of the first embodiment of the present invention, whereby a detailed explanation for the data driving integrated circuit 4101 to 410j will be omitted, and the same reference number will be used.

The flexible circuit film 620 is adhered to the liquid crystal display panel 100 and the printed circuit board 200 by a TAB process. The flexible circuit film 620 supplies image data and a data control signal (DCS) supplied from the printed circuit board 200 to each of the data driving integrated circuits 4101 to 410j and also supplies a gate control signal (GCS) supplied from the printed circuit board 200 to the gate driving circuit 700.

As explained in the LCD device according to the first embodiment of the present invention, the flexible circuit film 620 may include a first signal line 422 and a second signal line 424, wherein the first signal line 422 electrically connects the first output channel of the first data driving integrated circuit 4101 with a pixel voltage transmission line 210 on the printed circuit board 200, and the second signal line 424 electrically connects the pixel voltage transmission line 210 on the printed circuit board 200 with the (m+1)th data line (DLm+1).

Except that the gate driving circuit 700 according to the second embodiment of the present invention includes a plurality of gate driving integrated circuits 701 mounted in a chip type on the liquid crystal display panel 100 by a Chip-On-Glass process, the gate driving circuit 700 according to the second embodiment of the present invention is the same as the gate driving circuit according to the first embodiment of the present invention, whereby a detailed explanation for the gate driving circuit 700 according to the second embodiment of the present invention will be omitted.

The gate driving circuit 700 may be directly formed on the liquid crystal display panel 100 simultaneously with the thin film transistor by a Gate-In-Panel process or may be formed on the gate circuit film 4201 to 420j shown in the first embodiment of the present invention.

Except that the data driving circuit 600 and the gate driving circuit 700 are respectively mounted on the liquid crystal display panel 100 by a Chip-On-Glass process, the LCD device according to the second embodiment of the present invention is the same as the LCD device according to the first embodiment of the present invention, so that it is possible to realize the same effect as the first embodiment of the present invention.

In the aforementioned LCD device according to the second embodiment of the present invention, the pixel voltage supplied to the first and (m+1)th data lines is provided from the first output channel of the first data driving integrated circuit 4101 through the pixel voltage transmission line 210. However, it is not limited to this method. For example, as shown in FIG. 8, the pixel voltages supplied to the first and (m+1)th data lines may be provided from the (m)th output channel of the data driving circuit 400.

Accordingly, the pixel voltage having the polarity based on the column inversion method is output from the data driving circuit and is then supplied to the liquid crystal cells arranged in the zigzag pattern along the data lines, whereby the liquid crystal cells arranged in the liquid crystal display panel are driven in the dot inversion method, to thereby decrease power consumption.

Also, the first and (m+1)th data lines (DL1, DLm+1) are used in common through the use of pixel voltage transmission line 210 of electrically connecting the first and (m+1)th data lines (DL1, DLm+1) to each other, so that it is unnecessary to increase the output channel in any one of the data driving integrated circuits, to thereby reduce the manufacturing cost.

Through the use of the impedance adjustment device 220 connected to the pixel voltage transmission line 210, it is possible to adjust the entire impedance resulting in the output channel of the data driving integrated circuit for supplying the pixel voltage to the first and (m+1)th data lines, to thereby prevent the picture quality from being deteriorated by the delay of the pixel voltage.

While the impedance adjustment device 220 is shown on the printed circuit board 200, the impedance adjustment device 220 may also be included in the data driving circuit. Further, the present invention includes an embodiment without the impedance It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of driving a liquid crystal display device, wherein the liquid crystal device has liquid crystal cells arranged in an m×n matrix with m+1 data lines and n gate lines and wherein the liquid crystal cells in a column are alternatively connected to data lines on opposite sides of the column, comprising:
   receiving a frame of image data that includes horizontal lines of data;
   supplying $1^{st}$ through $m^{th}$ data in a first horizontal line of data to $1^{st}$ through $m^{th}$ data lines, wherein the polarity alternates along the first horizontal line of data;
   supplying the $1^{st}$ through $m-1^{th}$ data in a second horizontal line to the $2^{nd}$ through $m^{th}$ data lines and supplying the $m^{th}$ data in the second horizontal line to the $1^{st}$ data line, wherein the polarity alternates along the second horizontal line of data; and
   adjusting impedance levels of the $1^{st}$ data line electrically connected to the $m+1^{th}$ data line to separate impedance levels of the $1^{st}$ data line and the $m+1^{th}$ data line.

2. The method of claim 1, wherein adjusting impedance levels reduces the delay of a signal applied the $1^{st}$ data line electrically connected to the $m+1^{th}$ data line.

3. The method of claim 1, wherein adjusting impedance levels includes adjusting impedance levels of the $1^{st}$ data line electrically connected to the $m+1^{th}$ data line to be substantially equal to an impedance of the $2^{nd}$ through $m^{th}$ data lines.

4. The method of claim 1, wherein adjusting impedance levels includes buffering a driving signal applied to the $1^{st}$ data line and the $m+1^{th}$ data line.

5. An liquid crystal display device, comprising:
   m+1 data lines crossing n gate lines defining m×n pixels;
   m×n thin film transistors in each of the m×n pixels, wherein n thin film transistors in a column m are alternately connected to the $m^{th}$ data line and the $m+1^{th}$ data line;
   an electrical connector that connects a $1^{st}$ data line to an $m+1^{th}$ data line; and
   an impedance adjustment device along the electrical connector that adjusting impedance levels of the $1^{st}$ data line and the $m+1^{th}$ data line to separate impedance levels of the $1^{st}$ data line and the $m+1^{th}$ data line.

6. The liquid crystal display device of claim 5, wherein the impedance adjustment device reduces the delay of a signal applied to the electrical connector.

7. The liquid crystal display device of claim 6, further comprising:
   a printed circuit board including the electrical connector that connects the $1^{st}$ data line to the $m+1^{th}$ data line, wherein the impedance adjustment device is on the printed circuit board.

8. The liquid crystal display device of claim 6, wherein the impedance adjustment device is a buffer circuit.

9. The liquid crystal display device of claim 5, further comprising:
   a printed circuit board including the electrical connector that connects the $1^{st}$ data line to the $m+1^{th}$ data line;
   a plurality of tape carrier packages connecting the printed circuit board to a liquid crystal display panel, wherein each tape carrier package includes a data driver circuit.

10. The liquid crystal display device of claim 9, the electrical connector connects a first tape carrier package to a last tape carrier package.

11. The liquid crystal display device of claim 9, wherein the impedance adjustment device is on the tape carrier package.

12. The liquid crystal display device of claim 9, wherein the impedance adjustment device is included in the data driver circuit.

13. The liquid crystal display device of claim 5, further comprising:
   a timing controller including:
      a first alignment part that generates a horizontal line of input image data;
      a counting part that produces a control signal that indicates an even or odd numbered horizontal line of the input image data;
      a second alignment part that aligns the horizontal line of input image data according to the control signal.

14. The liquid crystal display device of claim 13, wherein the second alignment part circularly shifts the horizontal line of input image data.

* * * * *